US012592969B2

(12) United States Patent
Garg et al.

(10) Patent No.: US 12,592,969 B2
(45) Date of Patent: Mar. 31, 2026

(54) METHOD AND SYSTEM FOR PROTECTING SERVERLESS CLOUD ARCHITECTURE USING HONEYPOTS

(71) Applicant: Tata Consultancy Services Limited, Mumbai (IN)

(72) Inventors: Surabhi Garg, New Delhi (IN); Meena Singh Dilip Thakur, Bangalore (IN); Rajan Mindigal Alasingara Bhattachar, Bangalore (IN); Sachin Premsukh Lodha, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 92 days.

(21) Appl. No.: 18/899,300

(22) Filed: Sep. 27, 2024

(65) Prior Publication Data

US 2025/0175499 A1 May 29, 2025

(30) Foreign Application Priority Data

Nov. 23, 2023 (IN) .............................. 202321079724

(51) Int. Cl.
*H04L 9/40* (2022.01)

(52) U.S. Cl.
CPC .... *H04L 63/1491* (2013.01); *H04L 2463/102* (2013.01)

(58) Field of Classification Search
CPC ...................... H04L 63/1491; H04L 2463/102
USPC ......................................................... 726/23
See application file for complete search history.

(56) References Cited

U.S. PATENT DOCUMENTS

| | | | | |
|---|---|---|---|---|
| 2017/0339186 A1* | 11/2017 | Gurvich | .............. | H04L 61/5007 |
| 2018/0159897 A1 | 6/2018 | Kakumaru | | |
| 2020/0120082 A1* | 4/2020 | Cybulski | ................ | H04L 63/20 |
| 2023/0379362 A1* | 11/2023 | Ries | .................... | H04L 63/1491 |

FOREIGN PATENT DOCUMENTS

CN          107872467 A          4/2018

OTHER PUBLICATIONS

Kelly et al., "Denial of wallet—Defining a looming threat to serverless computing," Journal of Information Security and Applications, 60 (2021).

* cited by examiner

*Primary Examiner* — Anthony D Brown

(74) *Attorney, Agent, or Firm* — Finnegan, Henderson, Farabow, Garrett & Dunner, LLP

(57) ABSTRACT

Even though serverless computing has advantages like lower cost, simplified scalability, simplified backend code and quicker turnaround, they have also given rise to a new form of cyber-attacks. Most of the conventional approaches are reactive based where steps are taken to control the aftereffects of an attack and preventive mechanism is of less focus. The present honeypot based approach for serverless cloud architecture, honeypots capture unauthorized users in order to provide security of the overall system. The honeypots redirect the attackers to a set of dummy nodes that form a random loop. Using a controlled time based loop, the attacker could be trapped for a maximum amount of time, thus penalizing the attacker by a negative award. It would result in exhaustion of resources and bandwidth of attacker. The present disclosure is also applicable to multi-cloud or hybrid cloud setup.

12 Claims, 4 Drawing Sheets

receive a plurality of serverless workflows associated with a serverless cloud architecture and a total number of ingress points associated with the plurality of serverless workflows ⟩ 202 identify a plurality of triggered honeypots from among a plurality of honeypots associated with each of the plurality of ingress points during execution of a corresponding serverless workflows from among the plurality of serverless workflows ⟩ 204 redirect a plurality of attackers trapped in each of the plurality of triggered honeypots to a corresponding random loop from among a plurality of random loops, wherein each of the plurality of random loop comprises at least three dummy serverless functions performing a specific task irrespective of the plurality of serverless workflows associated with the serverless cloud architecture ⟩ 206 execute the redirected random loop corresponding to each of the plurality of triggered honeypots until a predefined threshold time to exhaust resources and bandwidth of the attacker without affecting actual serverless workflow of the serverless cloud architecture, wherein the predefined threshold time is computed using a cost optimization technique ⟩ 208

FIG. 2

METHOD AND SYSTEM FOR PROTECTING SERVERLESS CLOUD ARCHITECTURE USING HONEYPOTS

PRIORITY CLAIMS

This application claims priority under 35 U.S.C. § 119 from Indian Application No. 202321079724, filed on Nov. 23, 2023. The entire contents of the aforementioned application are incorporated herein by reference.

TECHNICAL FIELD

The disclosure herein generally relates to the field of cyber security and, more particularly, to a method and system for protecting serverless cloud architecture using honeypots.

BACKGROUND

Serverless computing is the latest paradigm in cloud computing, offering a framework for the development of event driven, pay-as-you-go functions in a highly scalable environment. A serverless provider allows users to write and deploy code without worrying the underlying infrastructure. An organization that gets backend services from a serverless vendor is charged based on their computation and do not have to reserve and pay for a fixed amount of bandwidth or number of servers, as the service is auto-scaling. There are many advantages of serverless computing like lower cost, simplified scalability, simplified backend code and quicker turnaround. While these traits offer a powerful new development paradigm, they have also given rise to a new form of cyber-attacks.

Most of the conventional cyber security approaches are reactive, where steps are taken to control the aftereffects of an attack and preventive mechanism is of less focus. Some of the conventional prevention mechanisms like Identity and Access Management (IAM), firewalls and Intrusion Detection Systems (IDSs) prevents attackers to some extent and fails to identify some critical insider attacks and outsider attacks. Further, most of the conventional approaches are deployed in traditional cloud architecture and no focus is given to serverless cloud architecture.

SUMMARY

Embodiments of the present disclosure present technological improvements as solutions to one or more of the above-mentioned technical problems recognized by the inventors in conventional systems. For example, in one embodiment, a method for protecting serverless cloud architecture using honeypots is provided. The method includes receiving, by one or more hardware processors, a plurality of serverless workflows associated with a serverless cloud architecture and a total number of ingress points associated with the plurality of serverless workflows. Further, the method includes identifying, by the one or more hardware processors, a plurality of triggered honeypots from among a plurality of honeypots associated with each of the plurality of ingress points during execution of a-corresponding serverless workflows from among the plurality of serverless workflows. Furthermore, the method includes redirecting, by the one or more hardware processors, a plurality of attackers trapped in each of the plurality of triggered honeypots to a corresponding random loop from among a plurality of random loops, wherein each of the plurality of random loop comprises at least three serverless dummy functions performing a specific task irrespective of the plurality of serverless workflows associated with the serverless cloud architecture. Finally, the method includes executing, by the one or more hardware processors, the redirected random loop corresponding to each of the plurality of triggered honeypots until a predefined threshold time to exhaust resources and bandwidth of the attacker without affecting actual serverless workflow of the serverless cloud architecture, wherein the predefined threshold time is computed using a cost optimization technique.

In another aspect, a system for protecting serverless cloud architecture using honeypots is provided. The system includes at least one memory storing programmed instructions, one or more Input/Output (I/O) interfaces, and one or more hardware processors operatively coupled to the at least one memory, wherein the one or more hardware processors are configured by the programmed instructions to receive a plurality of serverless workflows associated with a serverless cloud architecture and a total number of ingress points associated with the plurality of serverless workflows. Further, the one or more hardware processors are configured by the programmed instructions to identify a plurality of triggered honeypots from among a plurality of honeypots associated with each of the plurality of ingress points during execution of a-corresponding serverless workflows from among the plurality of serverless workflows. Furthermore, the one or more hardware processors are configured by the programmed instructions to redirect a plurality of attackers trapped in each of the plurality of triggered honeypots to a corresponding random loop from among a plurality of random loops, wherein each of the plurality of random loop comprises at least three serverless dummy functions performing a specific task irrespective of the plurality of serverless workflows associated with the serverless cloud architecture. Finally, the one or more hardware processors are configured by the programmed instructions to execute the redirected random loop corresponding to each of the plurality of triggered honeypots until a predefined threshold time to exhaust resources and bandwidth of the attacker without affecting actual serverless workflow of the serverless cloud architecture, wherein the predefined threshold time is computed using a cost optimization technique.

In yet another aspect, a computer program product including a non-transitory computer-readable medium having embodied therein a computer program for protecting serverless cloud architecture using honeypots is provided. The computer readable program, when executed on a computing device, causes the computing device to receive a plurality of serverless workflows associated with a serverless cloud architecture and a total number of ingress points associated with the plurality of serverless workflows. Further, the computer readable program, when executed on a computing device, causes the computing device to identify a plurality of triggered honeypots from among a plurality of honeypots associated with each of the plurality of ingress points during execution of a-corresponding serverless workflows from among the plurality of serverless workflows. Furthermore, the computer readable program, when executed on a computing device, causes the computing device to redirect a plurality of attackers trapped in each of the plurality of triggered honeypots to a corresponding random loop from among a plurality of random loops, wherein each of the plurality of random loop comprises at least three serverless dummy functions performing a specific task irrespective of the plurality of serverless workflows associated with the serverless cloud architecture. Finally, the computer readable program, when executed on a computing device, causes the computing device to execute the redirected random loop corresponding to each of the plurality of triggered honeypots until a predefined threshold time to exhaust resources and bandwidth of the attacker without affecting actual serverless workflow of the serverless cloud architecture, wherein the predefined threshold time is computed using a cost optimization technique.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIG. 2 illustrates a flow diagram for a processor implemented method for protecting serverless cloud architecture using honeypots, in accordance with some embodiments of the present disclosure.

DETAILED DESCRIPTION

Figure 1:
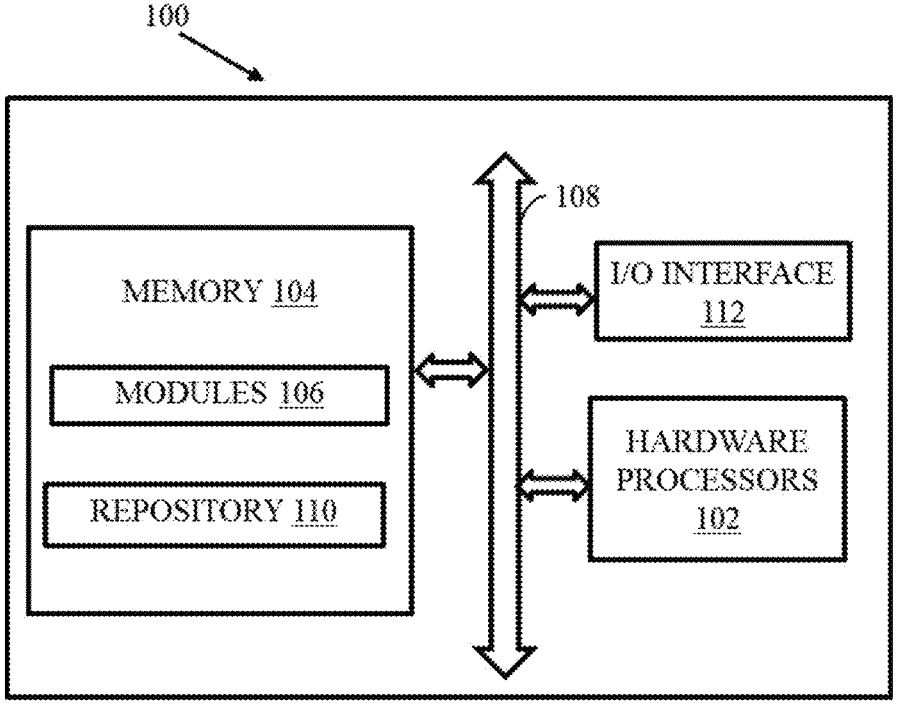
FIG. 1 is a functional block diagram of a system for protecting serverless cloud architecture using honeypots, in accordance with some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments.

Serverless computing offers a framework for the development of event driven, pay-as-you-go functions in a highly scalable environment. A serverless provider allows users to write and deploy code without worrying the underlying infrastructure. There are many advantages of serverless computing like lower cost, simplified scalability, simplified backend code and quicker turnaround. While these traits offer a powerful new development paradigm, they have also given rise to a new form of cyber-attacks. Most of the conventional approaches to prevent the cyber-attacks are deployed in traditional cloud architecture and no focus is given to serverless cloud architecture.

To overcome the challenges of the conventional approaches, embodiments herein provide a method and system for protecting serverless cloud architecture using honeypots. The present disclosure provides a general solution for securing serverless workflows by employing a Honeypot to trap cyber attackers and thereafter penalize the attackers by exhausting resources/bandwidth with the help of dummy nodes. The objective of the present disclosure is to design a honeypots based privacy preserving model for protecting serverless computing applications against various cloud vulnerabilities and threats including Critical vulnerabilities/misconfigurations on the cloud platforms, insufficient Identity and Access Management (IAM) and the insider attacks which are often undetected by the firewalls, Intrusion Detection Systems (IDSs) or authentication mechanisms. The present honeypot based approach for serverless cloud architecture, honeypots capture unauthorized users to provide security of the overall system. The honeypots redirect the attackers to a set of dummy nodes that form a controlled time based loop. The attacker could be trapped for a maximum amount of time, thus penalizing the attacker that would result in exhaustion of resources and bandwidth of attacker. The present disclosure is also applicable to multi-cloud or hybrid cloud setup.

It was observed that, delaying attacker progress, increasing risk of detection, and reducing the chance that exploits are successful ways that cyber deception can impose a cyber penalty on attackers. Further, based on the literature study, it was evident that the minimum cost incurred by an attacker to execute an attack on serverless workflows can be estimated to be approximately \$1 per day. Hence, the present disclosure provides an optimized solution so that that solution providers incur lesser cost than attackers in the same attack event.

Figure 4:
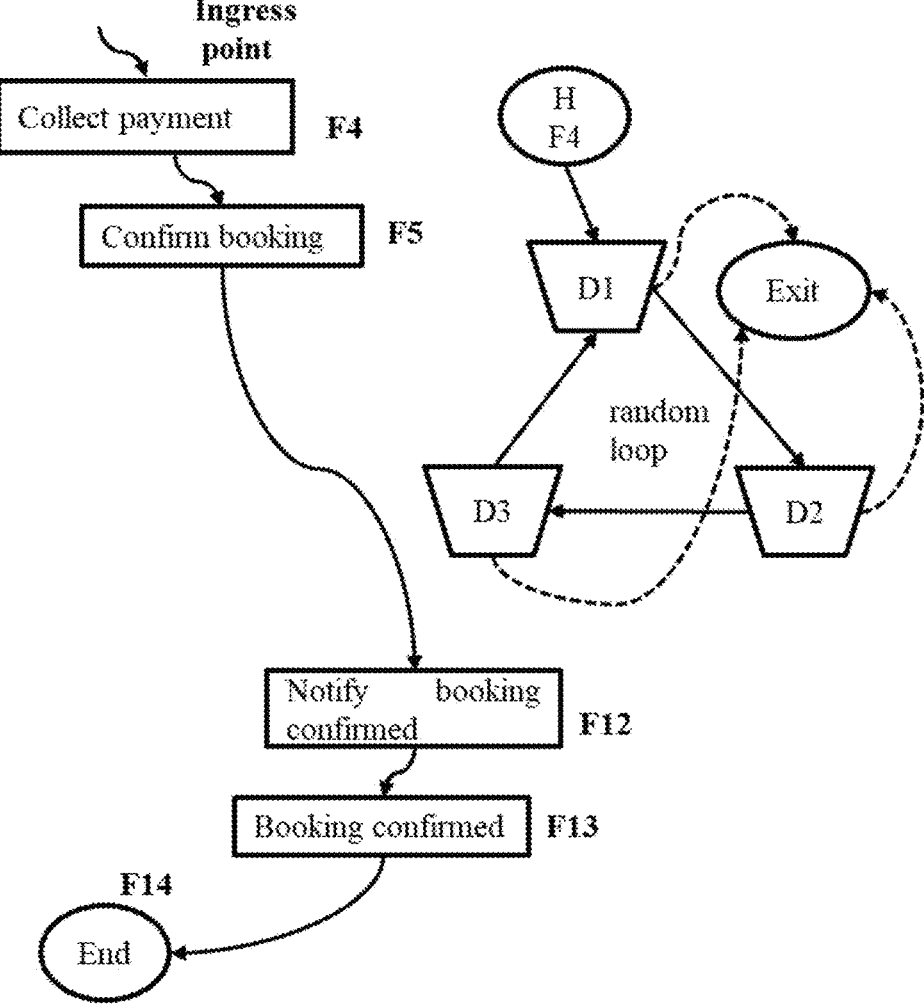
FIG. 4 illustrates a normal serverless workflow and a corresponding random loop for the processor implemented method for protecting serverless cloud architecture using honeypots, in accordance with some embodiments of the present disclosure.

Referring now to the drawings, and more particularly to FIG. 1 and FIG. 4, where similar reference characters denote corresponding features consistently throughout the figures, there are shown preferred embodiments and these embodiments are described in the context of the following exemplary system and/or method.

FIG. 1 is a functional block diagram of a system 100 for protecting serverless cloud architecture using honeypots, in accordance with some embodiments of the present disclosure. The system 100 includes or is otherwise in communication with hardware processors 102, at least one memory such as a memory 104, an Input/Output (I/O) interface 112. The hardware processors 102, memory 104, and the I/O interface 112 may be coupled by a system bus such as a system bus 108 or a similar mechanism. In an embodiment, the hardware processors 102 can be one or more hardware processors.

The I/O interface 112 may include a variety of software and hardware interfaces, for example, a web interface, a graphical user interface, and the like. The I/O interface 112 may include a variety of software and hardware interfaces, for example, interfaces for peripheral device(s), such as a keyboard, a mouse, an external memory, a printer and the like. Further, the I/O interface 112 may enable the system 100 to communicate with other devices, such as web servers, and external databases.

The I/O interface 112 can facilitate multiple communications within a wide variety of networks and protocol types, including wired networks, for example, local area network (LAN), cable, etc., and wireless networks, such as Wireless LAN (WLAN), cellular, or satellite. For the purpose, the I/O interface 112 may include one or more ports for connecting several computing systems with one another or to another server computer. The I/O interface 112 may include one or more ports for connecting several devices to one another or to another server.

The one or more hardware processors 102 may be implemented as one or more microprocessors, microcomputers, microcontrollers, digital signal processors, central processing units, node machines, logic circuitries, and/or any devices that manipulate signals based on operational instructions. Among other capabilities, the one or more hardware processors 102 is configured to fetch and execute computer-readable instructions stored in the memory 104.

The memory 104 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 104 includes a plurality of modules 106. The memory 104 also includes a data repository (or repository) 110 for storing data processed, received, and generated by the plurality of modules 106.

The plurality of modules 106 include programs or coded instructions that supplement applications or functions performed by the system 100 for protecting serverless cloud architecture using honeypots. The plurality of modules 106, amongst other things, can include routines, programs, objects, components, and data structures, which performs particular tasks or implement particular abstract data types. The plurality of modules 106 may also be used as, signal processor(s), node machine(s), logic circuitries, and/or any other device or component that manipulates signals based on operational instructions. Further, the plurality of modules 106 can be used by hardware, by computer-readable instructions executed by the one or more hardware processors 102, or by a combination thereof. The plurality of modules 106 can include various sub-modules (not shown). The plurality of modules 106 may include computer-readable instructions that supplement applications or functions performed by the system 100 for protecting serverless cloud architecture using honeypots.

The data repository (or repository) 110 may include a plurality of abstracted piece of code for refinement and data that is processed, received, or generated as a result of the execution of the plurality of modules in the module(s) 106.

Although the data repository 110 is shown internal to the system 100, it will be noted that, in alternate embodiments, the data repository 110 can also be implemented external to the system 100, where the data repository 110 may be stored within a database (repository 110) communicatively coupled to the system 100. The data contained within such external database may be periodically updated. For example, new data may be added into the database (not shown in FIG. 1) and/or existing data may be modified and/or non-useful data may be deleted from the database. In one example, the data may be stored in an external system, such as a Lightweight Directory Access Protocol (LDAP) directory and a Relational Database Management System (RDBMS). Working of the components of the system 100 are explained with reference to the method steps depicted in FIG. 2.

FIG. 2 is an exemplary flow diagrams illustrating a method 200 for protecting serverless cloud architecture using honeypots implemented by the system of FIG. 1 according to some embodiments of the present disclosure. In an embodiment, the system 100 includes one or more data storage devices or the memory 104 operatively coupled to the one or more hardware processor(s) 102 and is configured to store instructions for execution of steps of the method 200 by the one or more hardware processors 102. The steps of the method 200 of the present disclosure will now be explained with reference to the components or blocks of the system 100 as depicted in FIG. 1 and the steps of flow diagram as depicted in FIG. 2. The method 200 may be described in the general context of computer executable instructions. Generally, computer executable instructions can include routines, programs, objects, components, data structures, procedures, modules, functions, etc., that perform particular functions or implement particular abstract data types. The method 200 may also be practiced in a distributed computing environment where functions are performed by remote processing devices that are linked through a communication network. The order in which the method 200 is described is not intended to be construed as a limitation, and any number of the described method blocks can be combined in any order to implement the method 200, or an alternative method. Furthermore, the method 200 can be implemented in any suitable hardware, software, firmware, or combination thereof.

At step 202 of the method 200, the one or more hardware processors 102 are configured by the programmed instructions to receive a plurality of serverless workflows associated with a serverless cloud architecture and a total number of ingress points associated with the plurality of serverless workflows. Several workflows may have some common set of serverless functions executions.

Figure 3:
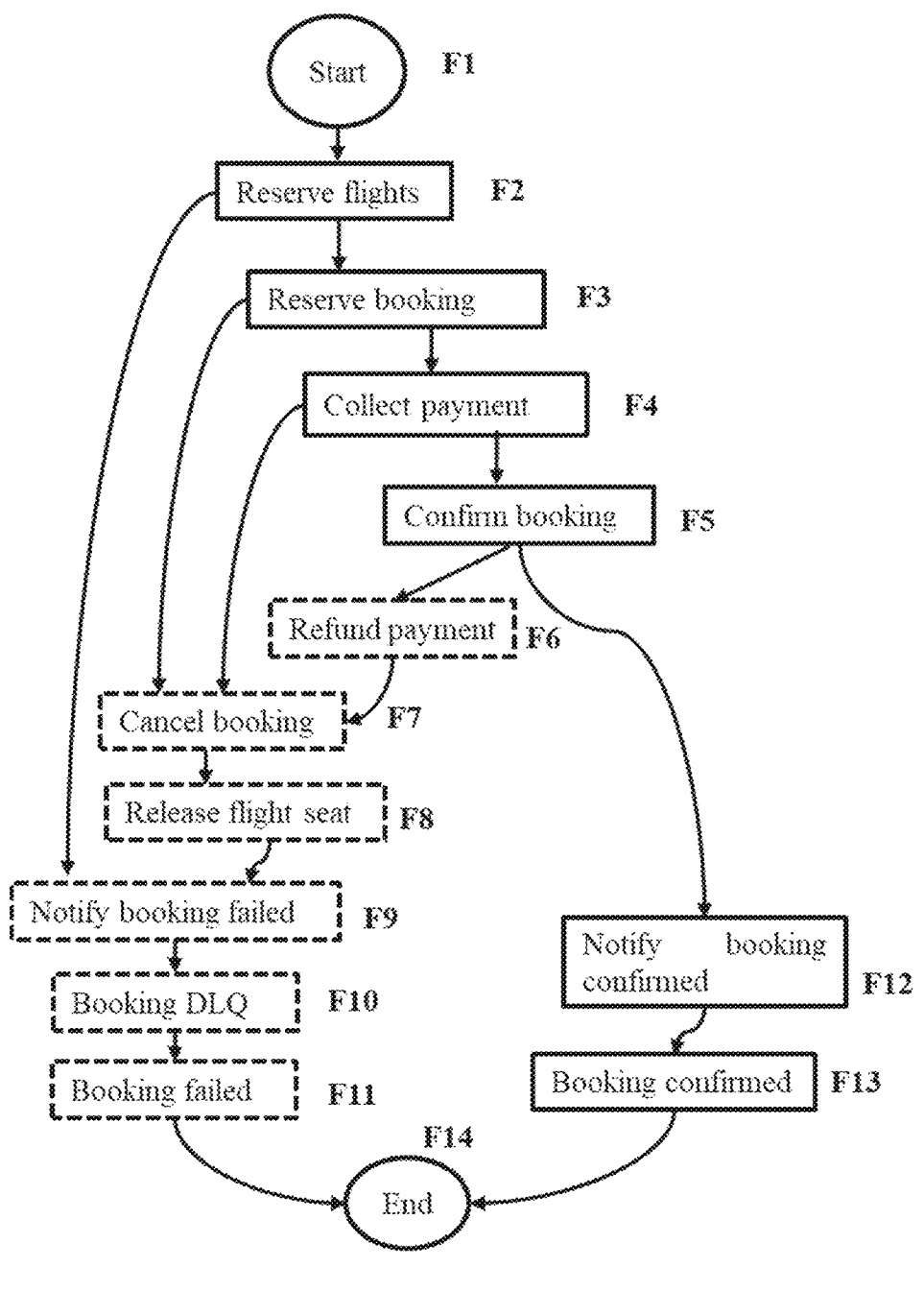
FIG. 3 illustrates an example serverless workflow for the processor implemented method for protecting serverless cloud architecture using honeypots, in accordance with some embodiments of the present disclosure.

FIG. 3 illustrates an example serverless workflow associated with a serverless airline booking system using Amazon Web Services (AWS™) Now referring to FIG. 3, the workflow starts with F1 and the path "reserve flights—F2", "reserve booking—F3", "collect payment—F4", "confirm booking—F5", "notify booking confirmed—F12", "booking confirmed—F13" and F14 forms a normal workflow for ticket reservation and the path F1 through F11 and F14 is a ticket cancellation path. For example, the function "collect payment—F4" is an ingress point of this serverless workflow where there is a chance for an attacker to penetrate.

At step 204 of the method 200, one or more hardware processors 102 are configured by the programmed instructions to identify a plurality of triggered honeypots from among a plurality of honeypots associated with each of the plurality of ingress points during execution of a corresponding serverless workflows from among the plurality of serverless workflows. The honeypots can be triggered by several events like URL based invocation or uploading a content in S3 bucket, wherein S3 bucket is a cloud object storage. For example, attacker may click on a phony URL that triggers the corresponding honeypot.

At step 206 of the method 200, one or more hardware processors 102 are configured by the programmed instructions to redirect a plurality of attackers trapped in each of the plurality of triggered honeypots to a corresponding random loop from among a plurality of random loops. Each of the plurality of random loop includes at least three serverless dummy functions (as shown in FIG. 4) performing a specific task irrespective of the plurality of serverless workflows associated with the serverless cloud architecture. For example, one serverless dummy function can receive some data from the attacker and redirect to another dummy node of the same random loop and the like. In other case, the dummy function may generate some print commands to manipulate the attacker. The three serverless dummy functions associated with each random loop is executed until a predefined time threshold. For example, a random loop is executed until the predefined time threshold to penalize the attacker without losing user revenue.

In an embodiment, the method of constructing a random loop includes the following steps. Initially, the total number of ingress points associated with each of the plurality of serverless workflows is obtained. Further, a plurality of random loops equal to the number of total ingress points are generated as described as follows: initially, number of dummy nodes to be created for each of the plurality of random loops is received from user. Further, a serverless dummy function is created for each dummy node, wherein each dummy serverless function is associated with a specific task. Further, each of a plurality of serverless dummy functions linked in such a way to form a controlled time base loop. Finally, a random execution time is assigned for each of the plurality of dummy serverless functions. The random execution time is selected from a plurality of random numbers. The random execution time pertaining to each of the plurality of serverless dummy functions are changed after each execution by selecting another random execution time from the plurality of random numbers. For example, the random execution time is configured based on the output of an optimization solver and logs of the serverless executions so that, adversary may not be able to distinguish the dummy workflow from that of genuine workflows.

FIG. 4 illustrates a serverless workflow and a honeypot associated with an ingress point F4. Now referring to FIG. 4, H F4 is the honeypot for the ingress point "collect payment—F4". The honeypot H F4 redirected the attacker to a corresponding random loop including 3 dummy nodes D1, D2 and D3. Each dummy node is connected to an exit point to enable smooth exit after the completion of the predefined threshold time. Each dummy node is associated with a function which is away from the normal execution of the serverless workflow. The said dummy nodes are linked in such a way that they are executed in the form of a loop. Each serverless dummy function/dummy node is having an execution time and the execution time is selected at random from the set of random numbers. The execution time is changed after each execution so that the attacker is unable to predict the execution time.

After redirection of the attacker by the honeypot, at step 208 of the method 200, one or more hardware processors 102 are configured by the programmed instructions to execute the redirected random loop corresponding to each of the plurality of triggered honeypots until a predefined threshold time to exhaust resources and bandwidth of the attacker without affecting actual serverless workflow of the serverless cloud architecture, wherein the predefined threshold time is computed using a cost optimization technique. The predefined threshold time is computed using a cost optimization technique/cost optimization objective function given in equation 2.

For example, to reduce an attacker's suspicions of having been trapped, the time delay between two dummy node invokes is randomized and is defined using a total cost function C as given in equation 1. Here, n is the number of function invokes and T is the total time.

$$C = \text{cost\_per\_invoke} \times n + \text{cost\_per\_ms} \times T \qquad (1)$$

The cost optimization objective function of the present disclosure is a multi-objective optimization function as given in equation 2. Now referring to equation 2, $k_1$ and $k_2$ are cost_per_invoke and cost_per_ms respectively. $T_j$ is a random variable denoting time delay of the jth dummy node of loop i. $l_i$ is a particular loop with i number of dummy nodes. E denotes the expectation of the choosing a particular loop with i nodes (denoted by $l_i$) j denotes the particular node index within a loop.

$$f(n, T) = k_1 n + k_2 E(l_i) \sum\nolimits_{p=1, j=1, j->(j+1)mod(i)}^{n} (T_j) \qquad (2)$$

A plurality of constraints are considered during cost optimization. The plurality of constraints are given below:
 (i) $n \geq 3$, signifies that at least three nodes are required to form a cycle or a loop
 (ii) $f(n, T) < \$1$. We observed from study that the minimum cost incurred by attackers per day for attempting a phishing-like attack is $1.

$$k_1 n + k_2 E(l_i) \sum\nolimits_{p=1, j=1, j->(j+1)mod(i)}^{n} (T_j) < 1$$

$$n < 1 - \left( k_2 E(l_i) \sum_{p=1, j=1, j->(j+1)mod(i)}^{n} (T_j) \right) / k_1$$

(iii) To prevent the possibility of trap detection by an attacker, we ensure that the attacker is continuously directed to one another node, rather than spending more time executing a particular dummy node. Hence, $$\frac{k_1 n}{k_2 E(l_i) \sum\nolimits_{p=1, j=1, j->(j+1)mod(i)}^{n} (T_j)} \geq 1$$

$$n \geq \left( k_2 E(l_i) \sum_{p=1, j=1, j->(j+1)mod(i)}^{n} (T_j) \right) / k_1$$

For example, if k1=$0.0000002, k2=$0.000000002, $E(l_i)$= 0.6. Then, our objective function takes the form:

$$f(n, T) = 0.0000002n + 0.000000002 E(l_i) \sum_{p=1, j=1, j->(j+1)mod(i)}^{n} (T_j)$$

Thus, the optimum total cost to be incurred by the organization/user while penalizing the attacker with n=3 and T=300 is $0.0000012 per day which is a minimum value.

Provided below are experiments conducted by implementing the system 100 for airline booking system. The airline booking system was a serverless application whose source code and deployment instructions were available in the open source domain on GitHub™. This application was written for AWS™ and had certain AWS™ Amplify dependencies and configurations hard coded in it.

For example, below are the time taken by the serverless functions of the airline booking system. F1: Billed Duration=152 ms, F2: Billed Duration=239 ms, F3: Billed Duration=254 ms, F4: Billed Duration=232 ms, F5: Billed Duration=212 ms, F12: Billed Duration=162 ms, F13: Billed Duration=136 ms, F14: Billed Duration=1 ms. Total Billed Duration1388 ms. Cost Incurred for the execution of workflow: $0.0000029148.

Further, it was identified that the method and system can identify insider attack performed to defame the airline company. For example, the insider attacker would change the policy permissions of the collect-payment function such that, after collecting payment from the end users, the control flow of the code would move directly to notify-bookingfailed instead of expected confirm-booking function, thus falsely informing the user that their booking failed though their payment went through successfully. In this way, the workflow is modified by the inside attacker.

Furthermore, it was identified that the present disclosure can identify an outsider Attack to Illegally Obtaining Sensitive User Information from Airline Database or the attacker trying to manipulate the workflow execution. For example, if a customer did not want to confirm their booking and wanted a refund, the present disclosure requires the user to upload their passport-sized photograph to authenticate the refund. The attacker would upload an image with a Structured Query language (SQL) query embedded in it as an executable and, once uploaded, this query would execute on the database and return all the stored sensitive data to the attacker. In such scenarios, the present disclosure created a honey S3 bucket corresponding to the genuine bucket which can trap the unauthorized users.

Trapping the Insider Attacker: A common medium of phishing attacks is to create a phony Uniform Resource Locator (URL) that looks identical to the genuine URL but contains a very minute difference. For example: www. google.com and www._google.com—notice the underline under first g in the second URL, it is almost invisible under the loop of the g. To trap the insider attacker, a phony URL is used to collect-payment function that would direct the attacker to the Honeypot and subsequently to the loop of Dummy Nodes. It is reasonable to assume that any user accessing the collect-payment externally is a malicious user, because this user would not have gone through the preceding steps of selecting and reserving a flight seat; the genuine URL to the collect-payment function would only be accessible from the previous function, and thus by a genuine user.

Trapping the Outsider Attacker: Using a python Optical Character Recognition (OCR) tool such as Tesseract, present disclosure scans the images for executable SQL queries, and on finding one the image is sent to a different S3 bucket, the Honeybucket/honeypot, which triggers the random loop of Dummy Nodes. To implement the first attack response method, a Function URL was created for the collect-payment and the Honeypot Lambda Functions. Using custom domains, it is possible to link these to domains that look alike and thus create the phishing URL scenario. The loop of Dummy Nodes was invoked from this Honeypot function. For the second attack response method, a second S3 bucket, the Honeybucket was created and added a trigger to the Dummy Nodes loop such that whenever a file is uploaded to this S3 Honeybucket, the random loop of Dummy Nodes would execute and trap the attacker.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address the unresolved problem of protecting serverless cloud architecture using honeypots. The present disclosure includes two parts. The first one being to trap the attacker using a honeypot, and the second being to penalize the attacker. There were two challenges in implementation of the present disclosure. The first challenge was to find ways to increase the chances of the attacker to get trapped in the Honeypot, since solutions involving. It was observed that there is approximately 50-50 chance of attackers entering into honeypot. The second challenge was to optimize the solution such that the attacker is penalized more than the developers are charged for the services employed in the solution.

It is to be understood that the scope of the protection is extended to such a program and in addition to a computer-readable means having a message therein such computer-readable storage means contain program-code means for implementation of one or more steps of the method when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs, GPUs and edge computing devices.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise. Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e. non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method comprising:

receiving, a plurality of serverless workflows associated with a serverless cloud architecture and a total number of ingress points associated with the plurality of serverless workflows;

identifying, a plurality of triggered honeypots from among a plurality of honeypots associated with each of the plurality of ingress points during execution of a-corresponding serverless workflows from among the plurality of serverless workflows;

redirecting, a plurality of attackers trapped in each of the plurality of triggered honeypots to a corresponding random loop from among a plurality of random loops, wherein each of the plurality of random loop comprises at least three serverless dummy functions performing a specific task irrespective of the plurality of serverless workflows associated with the serverless cloud architecture; and executing, the redirected random loop corresponding to each of the plurality of triggered honeypots until a predefined threshold time to exhaust resources and bandwidth of the attacker without affecting actual serverless workflow of the serverless cloud architecture, wherein the predefined threshold time is computed using a cost optimization technique.

2. The method of claim 1, wherein the at least three dummy serverless function associated with each honeypot is executed in a loop to penalize an attacker.

3. The method of claim 1, wherein the steps for constructing the plurality of random loops comprises:

receiving the total number of ingress points associated with the plurality of serverless workflows;

generating the plurality of random loops, wherein the number of random loops are equal to the total number of ingress points, by:

receiving a number of dummy nodes to be created for each of the plurality of random loops;

generating a serverless dummy function for each dummy node, wherein each dummy serverless function is associated with a specific task;

linking each of a plurality of serverless dummy functions forming controlled time based loop; and assigning a random execution time for each of the plurality of dummy serverless functions, wherein the random execution time is selected from a plurality of random numbers, wherein the random execution time pertaining to each of the plurality of serverless dummy functions are changed after each execution by selecting another random execution time from the plurality of random numbers.

4. The method of claim 1, wherein the cost optimization technique performs cost optimization based on a plurality of constraints and a plurality of parameters, wherein the plurality of parameters comprises cost per invoke, cost per millisecond, number of functions invoked, total time taken for execution of a random loop.

5. A system (100) comprising:

at least one memory (104) storing programmed instructions; one or more Input/Output (I/O) interfaces (112); and one or more hardware processors (102) operatively coupled to the at least one memory (104), wherein the one or more hardware processors (102) are configured by the programmed instructions to:

receive a plurality of serverless workflows associated with a serverless cloud architecture and a total number of ingress points associated with the plurality of serverless workflows;

identify a plurality of triggered honeypots from among a plurality of honeypots associated with each of the plurality of ingress points during execution of a-corresponding serverless workflows from among the plurality of serverless workflows;

redirect a plurality of attackers trapped in each of the plurality of triggered honeypots to a corresponding random loop from among a plurality of random loops, wherein each of the plurality of random loop comprises at least three serverless dummy functions performing a specific task irrespective of the plurality of serverless workflows associated with the serverless cloud architecture; and execute the redirected random loop corresponding to each of the plurality of triggered honeypots until a predefined threshold time to exhaust resources and bandwidth of the attacker without affecting actual serverless workflow of the serverless cloud architecture, wherein the predefined threshold time is computed using a cost optimization technique.

6. The system of claim 5, wherein the at least three dummy serverless function associated with each honeypot is executed in a loop to penalize an attacker.

7. The system of claim 5, wherein the steps for constructing the plurality of random loops comprises:

receiving the total number of ingress points associated with the plurality of serverless workflows;

generating the plurality of random loops, wherein the number of random loops are equal to the total number of ingress points, by:

receiving a number of dummy nodes to be created for each of the plurality of random loops;

generating a serverless dummy function for each dummy node, wherein each dummy serverless function is associated with a specific task;

linking each of a plurality of serverless dummy functions forming controlled time based loop; and assigning a random execution time for each of the plurality of dummy serverless functions, wherein the random execution time is selected from a plurality of random numbers, wherein the random execution time pertaining to each of the plurality of serverless dummy functions are changed after each execution by selecting another random execution time from the plurality of random numbers.

8. The system of claim 5, wherein the cost optimization technique performs cost optimization based on a plurality of constraints and a plurality of parameters, wherein the plurality of parameters comprises cost per invoke, cost per millisecond, number of functions invoked, total time taken for execution of a random loop.

9. One or more non-transitory machine-readable information storage mediums comprising one or more instructions which when executed by one or more hardware processors cause:

receiving, a plurality of serverless workflows associated with a serverless cloud architecture and a total number of ingress points associated with the plurality of serverless workflows;

identifying, a plurality of triggered honeypots from among a plurality of honeypots associated with each of the plurality of ingress points during execution of a-corresponding serverless workflows from among the plurality of serverless workflows;

redirecting, a plurality of attackers trapped in each of the plurality of triggered honeypots to a corresponding random loop from among a plurality of random loops, wherein each of the plurality of random loop comprises at least three serverless dummy functions performing a specific task irrespective of the plurality of serverless workflows associated with the serverless cloud architecture; and executing, the redirected random loop corresponding to each of the plurality of triggered honeypots until a predefined threshold time to exhaust resources and bandwidth of the attacker without affecting actual serverless workflow of the serverless cloud architecture, wherein the predefined threshold time is computed using a cost optimization technique.

10. The one or more non-transitory machine-readable information storage mediums of claim 9, wherein the at least three dummy serverless function associated with each honeypot is executed in a loop to penalize an attacker.

11. The one or more non-transitory machine-readable information storage mediums of claim 9, wherein the steps for constructing the plurality of random loops comprises:

receiving the total number of ingress points associated with the plurality of serverless workflows;

generating the plurality of random loops, wherein the number of random loops are equal to the total number of ingress points, by:

receiving a number of dummy nodes to be created for each of the plurality of random loops;

generating a serverless dummy function for each dummy node, wherein each dummy serverless function is associated with a specific task;

linking each of a plurality of serverless dummy functions forming controlled time based loop; and assigning a random execution time for each of the plurality of dummy serverless functions, wherein the random execution time is selected from a plurality of random numbers, wherein the random execution time pertaining to each of the plurality of serverless dummy functions are changed after each execution by selecting another random execution time from the plurality of random numbers.

12. The one or more non-transitory machine-readable information storage mediums of claim 9, wherein the cost optimization technique performs cost optimization based on a plurality of constraints and a plurality of parameters, wherein the plurality of parameters comprises cost per invoke, cost per millisecond, number of functions invoked, total time taken for execution of a random loop.

* * * * *